United States Patent
Oono et al.

[11] Patent Number: 6,122,112
[45] Date of Patent: Sep. 19, 2000

[54] LENS POSITION ADJUSTING METHOD FOR ZOOM LENS

[75] Inventors: Masahiro Oono, Saitama; Hisao Iwanade, Tokyo; Noboru Saitoh, Saitama; Koji Sato, Saitama; Sukenori Shiba, Saiitama; Tatsuya Yoshida, Saitama; Nobuyuki Nagai, Saitama, all of Japan

[73] Assignee: Asahi Kogaku Kogyo Kabushiki Kaisha, Tokyo, Japan

[21] Appl. No.: 09/078,541

[22] Filed: May 14, 1998

[30] Foreign Application Priority Data

| May 15, 1997 | [JP] | Japan | 9-126079 |
| May 15, 1997 | [JP] | Japan | 9-126080 |
| May 15, 1997 | [JP] | Japan | 9-126081 |

[51] Int. Cl.[7] .......................... G02B 15/14; G03B 17/00
[52] U.S. Cl. .................................. 359/694; 396/80
[58] Field of Search ....................... 359/694, 697; 396/72, 80, 81

[56] References Cited

U.S. PATENT DOCUMENTS

| 4,969,006 | 11/1990 | Ishibashi et al. | 396/104 |
| 5,038,163 | 8/1991 | Hirasawa | 354/900 |
| 5,065,172 | 11/1991 | Ogawa | 396/82 |
| 5,233,472 | 8/1993 | Haraguchi et al. | 359/694 |
| 5,400,110 | 3/1995 | Soshi et al. | 396/81 |
| 5,692,222 | 11/1997 | Yamada et al. | 396/51 |
| 5,774,748 | 6/1998 | Ito et al. | 396/80 |
| 5,815,748 | 9/1998 | Hamamura et al. | 396/104 |

FOREIGN PATENT DOCUMENTS

| 0560646 | 9/1993 | European Pat. Off. |
| 9-292563 | 9/1997 | Japan . |

*Primary Examiner*—Georgia Epps
*Assistant Examiner*—Ricky Mack
*Attorney, Agent, or Firm*—Greenblum & Bernstein P.L.C.

[57] ABSTRACT

A lens position adjusting method for a zoom lens includes at least two movable lens groups, one lens group being primarily utilized for focusing and the other lens group being primarily utilized for magnification, wherein an object at a predetermined distance is in-focus when each movable lens group is positioned at each of respective initialized positions thereof with the zoom lens being set at a first focal length, and wherein each movable lens group is moved to vary magnification in accordance with a moving amount from the initialized positions of the movable lens groups. The lens position adjusting method includes: arranging a testing object at a position corresponding to a predetermined distance from the zoom lens; arranging a focal point detecting device at a reference focal plane or in the vicinity of the reference focal plane of the zoom lens; moving each movable lens group to each position at the first focal length; moving each movable lens group along an optical axis of the zoom lens so that a lens moving amount of each movable lens group is detected when a sharp image of the testing object is formed on the focal point detecting device via the zoom lens; making each of the positions of the movable lens groups as provisional initialized positions after completion of movement by the lens moving amount from the initialized positions; moving each movable lens group from the provisional initialized positions to positions at a predetermined focal length; detecting the lens moving amount by moving the movable lens group being chiefly utilized for focusing; obtaining a defocus amount from the lens moving amount; and obtaining an adjusting amount according to the defocus amount detected at given plurality of focal lengths so that each position of the movable lens group at which the in-focus state with the testing object is obtained at the first focal length serves as each adjusted initialized position.

34 Claims, 5 Drawing Sheets

FIG. 4D $$\text{CONTRAST } R = \frac{V_{MAX} - V_{MIN}}{V_{MAX} + V_{MIN}}$$

LENS POSITION ADJUSTING METHOD FOR ZOOM LENS

BACKGROUND OF THE INVENTION

1. Field of the Invention the present invention relates to a method of adjusting the position of each lens group provided in a zoom lens and to a zoom lens utilizing the result of such adjustment.

2. Description of Background Information

A conventional zoom lens which includes two or three lens groups is generally provided with a cam mechanism for moving the focal length-varying lens groups in a predetermined relationship to vary magnification. In such a conventional zoom lens, a focusing lens group, which may also serve as one of the focal length-varying lens groups, is driven to bring an object into focus.

In such a conventional zoom lens provided with a cam mechanism, each lens group is steadily driven according to the profile of the cam mechanism. However, it is practically impossible to accurately correct the positional error of each movable lens group occurred at the time of manufacture or assembly of the zoom lens Furthermore, in such a conventional zoom lens, a cam having cam edges or grooves with complicated contours needs to be provided, which results in a high production cost. In addition, the zoom lens needs to have sufficient space for positioning the cam mechanism inside the zoom lens, which makes it difficult to miniaturize the zoom lens.

In order to overcome the aforementioned problems that occur upon utilizing a cam, there has been proposed a mechanism for zooming in which the focal length varying lens groups and the focusing lens group are each independently driven relative to each other. In this case, position of each focal length-varying lens group which varies due to a zooming operation and the position of the focusing lens group which varies in accordance with an object distance are given through a predetermined calculation. Further, for each of a plurality of focal lengths of the zoom lens, the corresponding position of the focusing lens group with reference to a specific position thereof at which the zoom lens is focused on an object at infinity is calculated and is stored in advance as positional data in a storing device such as a ROM. Subsequently, after the focal length-varying lens group(s) is driven to vary the magnification, the stored positional data of the focusing lens group for the current position(s) of the focal length-varying lens group(s) is read from the ROM and the focusing lens group moves to the position corresponding to the read positional data. Such a zooming mechanism has been proposed in, for example, Japanese Patent Application No.7-172216.

For such a zoom lens (including a vari-focal lens) position at relationship of the focal length-varying lens group and the focusing lens group of the zoom lens often deviate from the designed positions due to error originated in the manufacturing and/or assembling process, or change of temperature. Accordingly, in order to eliminate the deviation as above described, a zooming adjustment and a focus adjustment should be carried out. When zooming adjustment is carried out, the position of each focal length-varying lens group of the zoom lens is adjusted so that an appropriate in-focus state can be obtained at a plurality of focal lengths, including at least the shortest focal length and the longest focal length. The focus adjustment is carried out after the zooming adjustment is completed. During focus adjustment, the focus point of the zoom lens is adjusted so as to coincide with a reference focal plane, namely an image plane such as a film plane or the light receiving surface of an image pick-up device (CCD), etc. Therefore, there has been a strong need for means a for detecting such error and for correcting the same.

With the above mentioned zoom lens problems taken into consideration, it is the object of the present invention to provide a zoom lens adjusting method of which the focal length and the lens position can be easily adjusted, and wherein it is possible for the focal length varying lens group and the focusing lens group to be freely designed.

Another object of the present invention is to provide a zoom lens in which the above-mentioned adjusting method can be carried out during zoom operation according to adjustment data obtained by the above method of adjusting.

SUMMARY OF THE INVENTION

To achieve the object mentioned above, according to an aspect of the present invention, there is provided an initialized lens position adjusting method for a zoom lens including at least two movable lens groups, one lens group being chiefly utilized for focusing and the other lens group being chiefly utilized for varying magnification, wherein an object at a predetermined distance is in-focus when each movable lens group is positioned at each initialized positions thereof with the zoom lens being set at a first focal length, and wherein each of the movable lens groups is moved to vary magnification in accordance with a moving amount from the initialized positions of the movable lens groups, the lens position adjusting method including: arranging an object at a position corresponding to a predetermined distance from the zoom lens; arranging a focal point detecting means at a reference focal plane or in the vicinity of the reference focal plane of the zoom lens; moving each movable lens group to first focal-length position and to at least a second focal-length position; detecting a defocus amount at a given plurality of focal lengths by the focal point detecting means corresponding to a difference between a position at which a image of the testing object is formed via the zoom lens and the reference focal plane; and obtaining an adjusting amount according to the defocus amount detected at given plurality of focal lengths so that each position of the movable lens group at which the in-focus state with the testing object is obtained at the first focal length serves as each new initialized position.

Further, there is provided an initialized lens position adjusting method for a zoom lens including at least two movable lens groups, one lens group being chiefly utilized for focusing and the other lens group chiefly serves varying magnification, wherein an object at a predetermined distance is in-focus when the at least two movable lens groups are positioned at respective initialized positions thereof with the zoom lens being set at a first focal length, and wherein the at least two movable lens groups are moved to vary magnification in accordance with predetermined data while the in-focus state for the object is maintained, the lens position adjusting method includes: arranging a focal point detecting means at a reference focal plane or in the vicinity of the reference focal plane of the zoom lens; arranging an object moving means which forwardly and rearwardly, along the optical axis of the zoom lens, moves either a collimating lens or an object placed at the focal point of the collimating lens in front of the zoom lens; moving each movable lens group to at least the first focal length at each position thereof; moving either the collimating lens or the object along the optical axis of the zoom lens so that a moving amount of the collimating lens or the object is detected when an image of the object is formed on the focal point detecting means through the collimating lens and the zoom lens; obtaining a defocus amount which corresponds to a difference between a position of the image of the object and a position the reference focal plane; and obtaining an adjusting amount according to the defocus amount so that each position of the movable lens group at which the in-focus state with the object is obtained serves as each adjusted initialized position.

Further, there is provided an initialized lens position adjusting method for a zoom lens including at least two movable lens groups, one lens group being chiefly utilized for focusing and the other lens group being chiefly utilized for varying magnification, wherein an object at a predetermined distance is in-focus when each movable lens group is positioned at the respective initialized position thereof with the zoom lens being set at a first focal length, and wherein each movable lens group is moved to vary magnification in accordance with a moving amount from the initialized positions of the movable lens groups; the lens position adjusting method includes: arranging an object at a position corresponding to a predetermined distance from the zoom lens; arranging a focal point detecting means at a reference focal plane or in the vicinity of the reference focal plane of the zoom lens; moving each movable lens group to each position thereof at the first focal length; moving each movable lens group along the optical axis of the zoom lens so that a lens moving amount of movable lens group is detected when an image of the testing object is formed on the focal point detecting means via the zoom lens; making each position of the movable lens groups a provisional initialized position after completion of movement by the lens moving amount from the initialized positions; moving each movable lens group from the provisional initialized positions to positions at a predetermined focal length; detecting the lens moving amount by moving the movable lens group chiefly utilized for focusing; obtaining a defocus amount from the lens moving amount; and obtaining an adjusting amount according to the defocus amount detected at given plurality of focal lengths so that each position of the movable lens group at which the in-focus state with the testing object is obtained at the first focal length serves as each adjusted initialized position.

Further, there is provided a zoom lens constituting: at least two movable lens groups, wherein an object at a predetermined distance is in-focus when at least two movable lens groups are positioned at respective initialized positions thereof with the zoom lens being set at first focal length, and wherein at least two movable lens groups are moved to vary magnification in accordance with predetermined data while the in-focus state for the object is maintained; an initial position detecting means for detecting whether at least two movable lens groups are positioned at the respective initialized positions thereof; a memory for storing data of the moving amount of each movable lens group from the respective initialized positions detected by the initialized position detecting means to positions at a predetermined focal length and at which a image of the object at the predetermined distance is formed; and wherein the zoom lens is adjusted so that the initial position detecting means detects the adjusted initialized positions according to the adjusting amount obtained by any of the above-described methods, and according to the final adjusting amount of initialized positions.

BRIEF DESCRIPTION OF THE DRAWINGS

The above and other features and advantages of the present invention will be made apparent from the following description of the preferred embodiments, given as non-limiting examples, with reference to the accompanying drawings in which.

DETAILED DESCRIPTION OF THE PREFERRED EMBODIMENTS

Figures 1A, 1B:
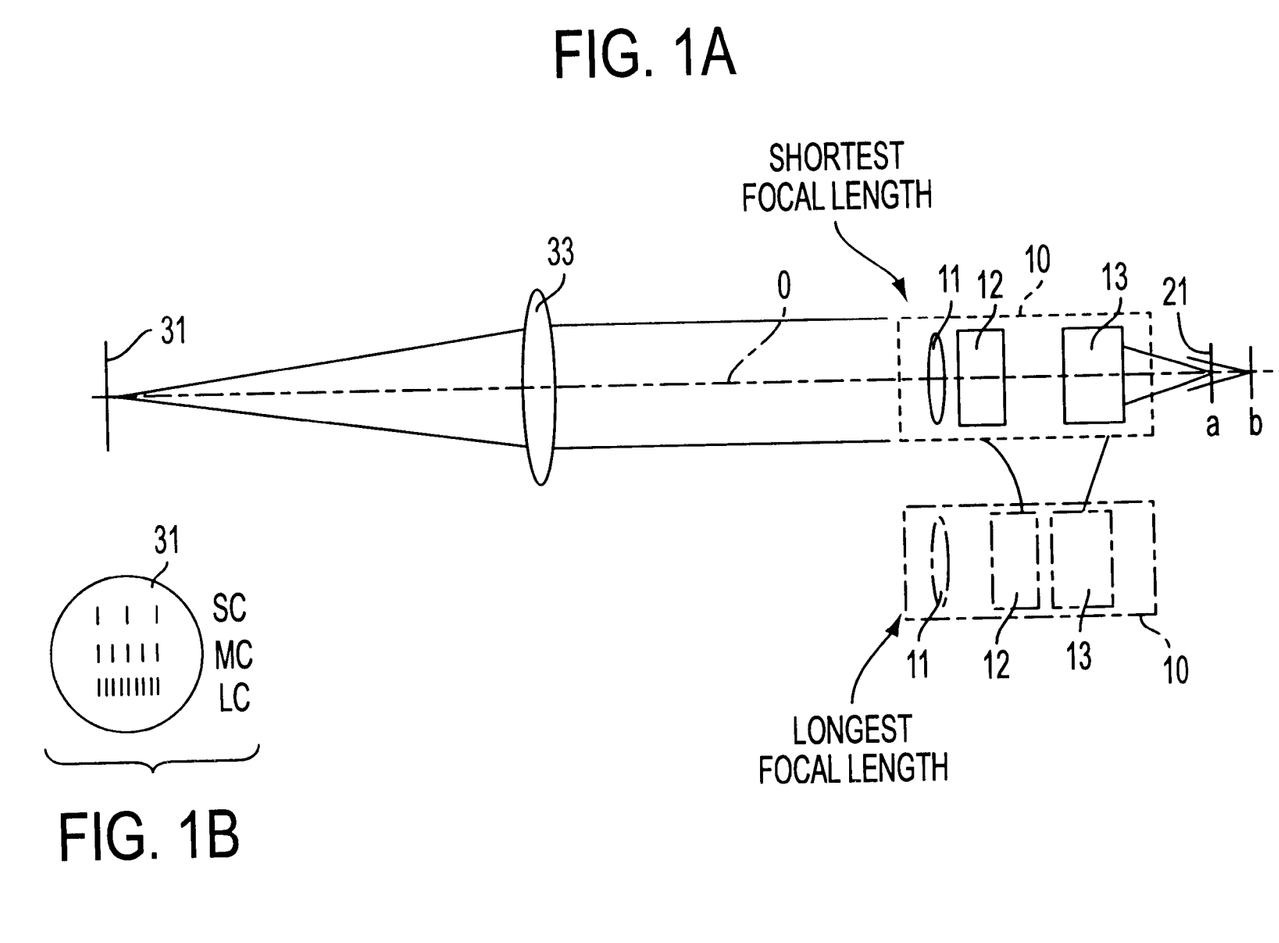
FIG. 1 is an explanatory view showing the construction of the zoom lens and adjustment of the initial position of the zoom lens according to the present invention.

The present invention will be described with reference to the drawings. FIG. 1A shows the main concept of the zoom lens construction when the in-line zoom lens having three lens groups (vari-focal lens) is applied according to the present invention and when the initialized positions are adjusted.

The zoom lens 10 of FIG. 1A consists of one fixed lens group (i.e., first lens group) 11 and two movable lens groups (i.e., second and third lens groups) 12 and 13.

The zoom lens 10 is a vary-focal type lens, in which a zooming operation (focal length varying operation) is carried out by moving the second and third lens groups 12 and 13, while a focusing operation is carried out by moving the second lens group 12. The zoom lens 10 does not utilize a cam to move the second and third lens groups 12 and 13 relative to each other. The positions of the second lens group 12 is controlled by an open system and third lens group 13 is controlled by a closed-loop control system, in accordance with set focal length information (information on respective positions of the second and third lens groups 12 and 13) and object distance information. The second and third lens groups 12 and 13 are guided in the direction of the optical axis by a helicoid mechanism or a rack-and-pinion mechanism (not shown) and driven by the mechanism via first and second stepping motors M2 and M3, respectively (see FIG. 2). The drivings of the stepping motors M2 and M3 are each controlled by a drive controller 17. The aforementioned helicoid mechanism, the stepping motors M2 and M3, and the drive controller 17 together constitute a focusing and zooming controller.

In the zoom lens 10 shown in FIG. 1A, the initialized position (absolute reference position) of the second and third lens groups 12 and 13 is determined as a position where an object at infinity is in focus when the second and third lens groups 12 and 13 are set at the shortest focal length S; the shortest focal length S being the first focal length. The initialized positions (absolute positions) of the second and third lens groups 12 and 13 are detected by initialized position sensors which serve as an initialized position detecting means (according to the present embodiment, photo sensors 15 and 16). The position of the second lens group 12 at a predetermined focal length is determined and detected using the number of drive pulses for stepping motor M2. Likewise, the position of the third lens group 13 at a predetermined focal length is determined and detected using the number of drive pulses for stepping motor M3. It should be noted, however, in regard to the zoom lens 10, whether the object at infinity is actually in focus is not detected via the zoom lens 10. Therefore the drive controller 17 only determines whether the second and third lens groups 12 and 13 are at positions where an object at infinity can be in focus when the second and third lens groups 12 and 13 are set at the shortest focal length S; hence, the actual focal state is not attained.

The zoom lens 10 is designed such that in a zooming position at which the shortest focal length S is set, the third lens group 13 is positioned at its rearmost position, while the second lens group 12 is positioned at its frontmost position (separate from the third lens group) (see the position arrangements thereof indicated by solid lines of FIG. 1A). In a second zooming position at which the longest focal length L is set, the third lens group 13 is positioned at its frontmost position, while the second lens group 12 is positioned at its rearmost position (closely approaching the third lens group 13) (see also the position arrangements indicated by one-dot chain lines of FIG. 1A).

In the zoom lens 10, once any single focal length is selected, i.e., once the position of the third lens group 13 is determined, the amount of movement of the second lens group 12 from its initialized position is automatically determined. Therefore, the focal length which is determined by the position of the third lens group 13 after it is moved for zooming can be represented by the amount of movement of the third lens group 13 from its initialized position, i.e., the number of drive pulses of the stepping motor M3. Likewise, the position of the second lens group 12 focused on an object at infinity at each focal length can be represented by the amount of movement of the second lens group 12 from its initialized position, i.e., the number of drive pulses of the stepping motor M2.

Hence, within the zooming focal-length range of the zoom lens 10, the focal positions at infinity of the second lens group 12 for a plurality of focal lengths is calculated; and all the focal lengths corresponding to the focal positions at infinity of the second lens group 12 are represented by corresponding movement data from the initialized positions to be stored in a memory such as an EEPROM 18 as a zoom data table.

Further, for each of the aforementioned plurality of given focal lengths, respective amounts of movement of the second lens group 12 for a plurality of given object distances are determined and stored in the EEPROM 18 as a moving amount data determined in accordance with the focal length and the object distance (i.e., focus data table). In the focusing operation, data representing the amount of movement of the second lens group 12 is selected from the aforementioned focus data table in accordance with a detected position of the third lens group 13 (i.e., a detected focal length) and a detected object distance of an object to move the second lens group 12 by the selected amount to bring the object into focus.

Furthermore, it should be noted that the in-focus position of the second lens group 12 can be determined, based on the measured object distance according to the focal distance and a distance measuring device (not shown) deduced from the position of the third lens group 13, by referring to the amount of movement from its initialized position; and whereby according to the calculated amount of movement, focal adjustment is performed, moving the second lens group 12 accordingly.

According to the aforementioned methods, the focusing operation is carried out to bring an object into focus after the zooming operation is completed. However, it is possible to carry out the zooming operation while maintaining an in-focus state on an object. For instance, when an object distance is initially measured at any one set focal length and subsequently the second lens group 12 is moved to a position to bring an object into focus, the measured object distance is stored in a RAM. Thereafter, the focal length which is determined after the zooming operation is completed (i.e., the position of the third lens group 13) is measured (calculated or selected), and subsequently data representing the amount of movement of the second lens group 12 which corresponds to the focal length and the object distance stored in the RAM is selected so as to move the second lens group 12 in accordance with the selected data.

Alternatively, the second lens group 12 is driven together with the third lens group 13 in accordance with the direction of zooming, and when the zooming operation is completed, data representing the amount of movement of the second lens group 12 which corresponds to the currently-set focal length and the object distance is selected so as to move the second lens group 12 in accordance wit h the selected data. In this method, after the zooming operation is completed, if the object distance is measured again and subsequently data representing the amount of movement of the second lens group 12 which corresponds to the measured focal length and the measured object distance is selected to move the second lens group 12 in accordance with the selected data, a more precise focusing state can be maintained.

Each of the second and third lens groups 12 and 13 is independently driven by the corresponding stepping motors M2 and M3, respectively. The term "zooming" herein used means to move each of the second and third lens groups 12 and 13 to vary the focal length of the zoom lens 10 so as to bring an object in infinity into focus. To carry out such a zooming operation, for instance, either the following first or second control methods can be used.

In the first control method, stepping motors M2 and M3 are simultaneously actuated. When the stepping motor M3 stops, the stepping motor M2 is controlled to stop after the second lens group 12 has reached its position corresponding to that position of the third lens group 13.

In the second control method, stepping motor M3 is initially actuated to move the third lens group 13 first. After stepping motor M3 stops, stepping motor M2 is actuated to move the second lens group 12 to its position corresponding to the position of the third lens group 13. Stepping motor M2 eventually stops after reaching the position as described above.

Precise initialized positions of the second and third lens groups 12 and 13 can be obtained if the zoom lens 10 is precisely made and assembled in an ideal manner. However, in many cases, such precise initialized positions cannot be obtained due to errors originated in assembling and/or manufacturing process. It is often the case that the precise initialized positions cannot be obtained when the photosensors 15 and 16 are not precisely positioned. Therefore, even if the third lens group 13 is precisely moved by an amount corresponding to the data selected from the aforementioned zoom data table and at the same time the second lens group 12 is precisely moved by an amount corresponding to the position at which the third lens group 13 stops (the focal length) or the set focal length, it is sometimes the case that the zoom lens 10 is not appropriately focused on an object at infinity.

The present invention relates to a method of adjusting the zoom lens 10, in which the initialized position thereof may be focused on an object at a predetermined distance at a predetermined focal length.

Figure 2:
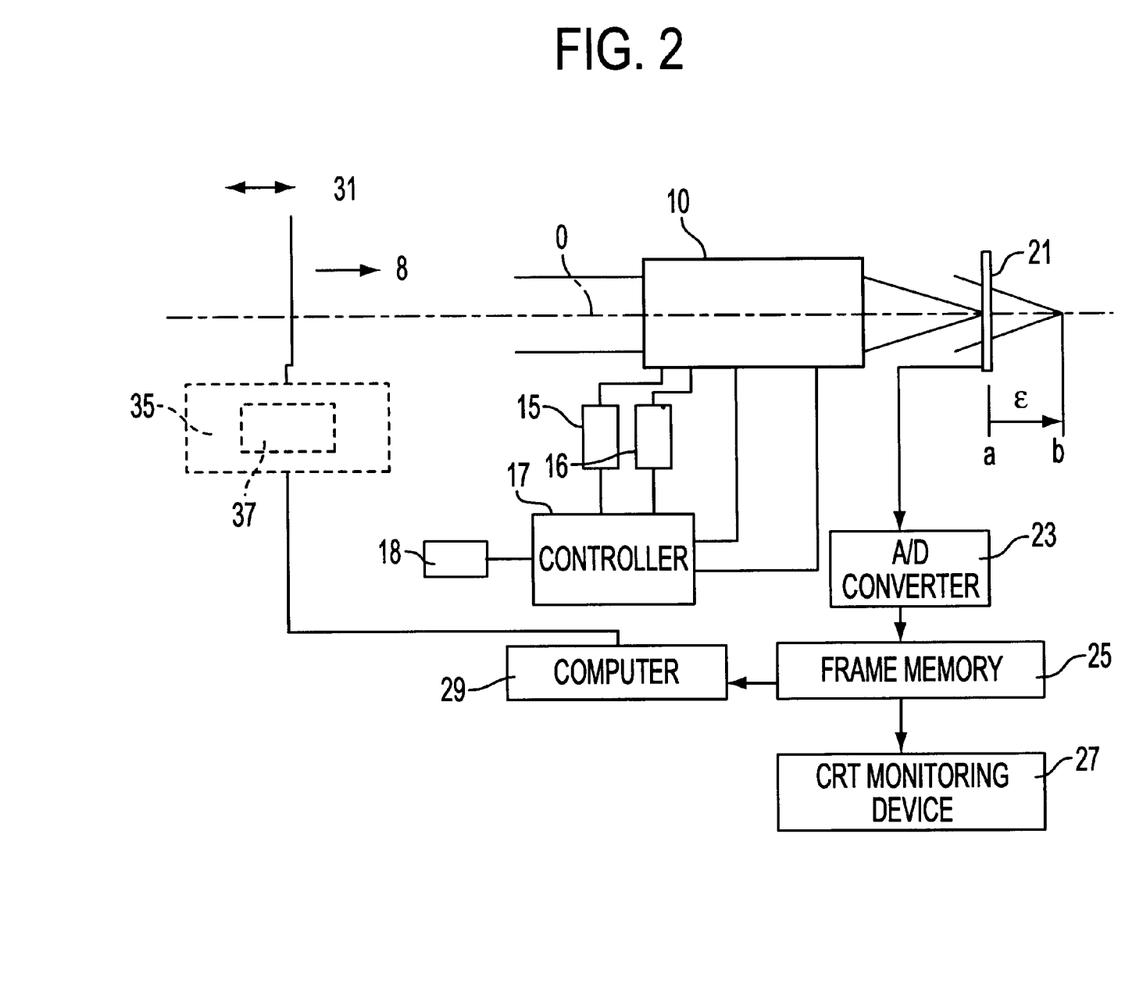
FIG. 2 is a block diagram showing the movement of the chart plate via a device having the same adjusting method.

FIG. 1A shows an embodiment of a device which carries out the adjusting method according to the present invention. In this embodiment, the image printed on the testing chart plate 31 (note FIG. 1B) is formed on the CCD image pick-up device 21 via the collimating lens 33 and the zoom lens 10, so that the image formed on the CCD image pick-up device 21 is converted by the same into electrical signals (image signals). In accordance with the obtained image signals whether a image of the testing chart plate 31 is formed on the CCD image pick-up device 21 is detected to determine the amount of adjusting the initialized position (i.e., the amount of defocus adjustment) for each of the second and third lens groups 12 and 13.

The zoom lens 10 is mounted on an adjusting block (not shown), and the drive controller 17 is connected to a computer 29 (see FIG. 2). Further, the testing chart plate 31 and the collimating lens 33 are set so that the adjustment can be carried out.

In an embodiment of the adjusting method according to the present invention, the second and third lens groups 12 and 13 are moved to obtain the shortest focal length S, namely, each of the second and third lens groups 12 and 13 is moved to be positioned at its initialized position. Subsequently, the amount of defocusing with respect to the testing chart plate 31 at the shortest focal length S is determined. Thus the overall adjusting amount (i.e., the adjusting amount of the initialized positions) of both the second and third lens groups 12 and 13 in order to be focused on the testing chart plate 31 is obtained. Thereafter, the second and third lens groups 12 and 13 are moved according to the overall adjusting amount. The positions of the lens groups after completion of movement according this overall adjusting amount represent provisional initialized positions (i.e., the first adjustment [adjustment 1]). The identical overall adjusting amount shall be identical to each of the lens groups 12 and 13.

Next, after the second and third lens groups 12 and 13 positioned at their provisional initialized positions, the second and third lens groups 12 and 13 are moved by a necessary amount in order provide zooming from the shortest focal length to the longest focal length L in accordance with the zoom data table. Subsequently, the amount of defocusing with respect to the testing chart plate 31 at the longest focal length L is determined (i.e., the second adjustment [adjustment 2]).

Thereafter, the adjusting amount of the second lens group 12 and the overall adjusting amount of both the second and third lens groups 12 and 13 are obtained according to the amount of defocusing at the longest focal length L obtained in the adjustment 2. The adjusting amount corresponds to the adjusting amount of the second lens group 12 required to coincide the in-focus position in the shortest focal length S with that in the longest focal position L. The overall adjusting amount corresponds to the final adjusting amount of initialized positions of the second and third lens groups 12 and 13 required to coincide the in-focus positions in both the shortest focal length S and the longest focal length L with the position of the reference focal plane.

Accordingly, the second and third lens groups 12 and 13 are moved to again have the shortest focal length S in accordance with the zoom data table; namely, each of the second and third lens groups 12 and 13 is moved back to the provisional initialized position from the position in the longest focal length L. Subsequently, each of the second and third lens groups 12 and 13 is moved from the provisional initialized position by an amount for adjustment in accordance with the adjustment amount of the second lens group and the final adjusting amounts of the initialized positions. The obtained positions are referred to as adjusted initialized positions (i.e., the third [adjustment 3]).

Subsequently the second and third lens groups 12 and 13 are respectively moved so that the amount of defocusing ΔS in the shortest focal length S may be measured. Note that each of the positions of the second and third lens groups 12 and 13 coincides with the adjusted initialized position in the shortest focal length S. In the same manner as that of the shortest focal length S, the amount of defocusing ΔM in the intermediate focal length M and the amount of defocusing ΔL in the longest focal length L are measured. If all of the absolute values of the obtained amounts of defocusing ΔS, ΔM and ΔL are smaller than the predetermined value, the adjustment is completed. Conversely, if any of the absolute values of the obtained amounts of defocusing ΔS, ΔM or ΔL are larger than the predetermined value, the adjustments 1, 2 and 3 as described above are repeated until all of the absolute values as described above become smaller than the predetermined value (i.e., the fourth adjustment (the adjustment 4)). The absolute value of the predetermined value (plus) and that of the predetermined value (minus) may be different from each other, or each value may be the same value regardless of the focal length. Further, the value may also be set according to variation of the focal length.

According to the result of adjusting as above described, the zoom lens 10 may further be adjusted as follows:

(1) The positions of the photo sensors 15 and 16 are changed so that the adjusted initialized positions of the second and third lens groups 12 and 13 after completion of the adjustment 4 are detected as the initialized positions.

(2) The adjusting amount of the initialized position in which the second lens group 12 is moved from the initialized position, and the other adjusting amount of the initialized position in which the third lens group 13 is moved from the initialized position, are respectively obtained from the adjusting amount of the second lens group and from the adjusting amounts of the initialized positions, and are stored in the EEPROM 18. During operation of the zoom lens camera, when the second and third lens groups are respectively moved to the initialized positions, the adjusting amounts and the final adjusting amounts of the initialized positions are read, thus the second and third lens groups 12 and 13 are once moved to the initialized positions, and subsequently moved to the adjusted initialized positions. Thereafter, the zooming operation is carried out with reference to the adjusted initialized positions. Alternatively, each of the second and third lens groups 12 and 13 is positioned at the initialized position, and when the second and third lens groups move to any zooming position, the corresponding adjusting amounts and the final adjusting amounts of the initialized positions are read so that the second and third lens groups 12 and 13 may respectively be adjusted at the corresponding zooming position.

(3) The amounts of defocusing at any zooming position ΔS, ΔM or ΔL obtained in the adjustment 4 of the first routine (adjustments 1–4) are stored in the EEPROM 18 as correcting data, which may be used for adjusting the moving amounts of the second and third lens groups 12 and 13 together with the data of zoom table while the zooming operation of the camera according to the present invention is carried out.

After the above-described adjustments are completed, the amount of defocusing for an object at infinity is greatly reduced or substantially eliminated at any focal length of the zoom lens 10.

Figure 3A:
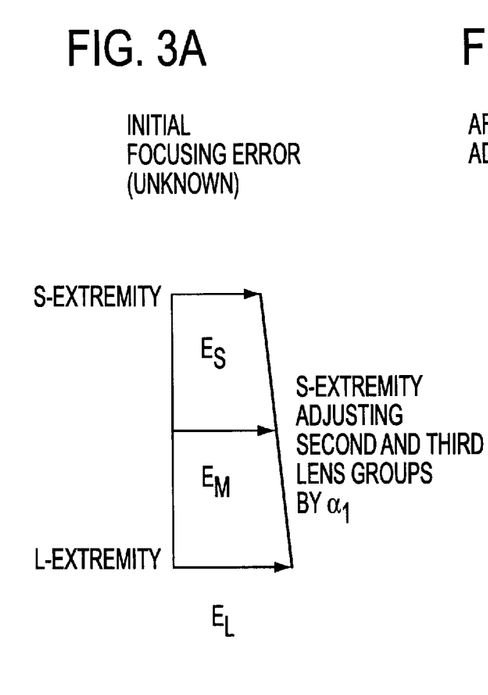
FIGS. 3A–3D are explanatory views showing a state of reducing a defocus amount step by step.
Figures 3B, 3C:
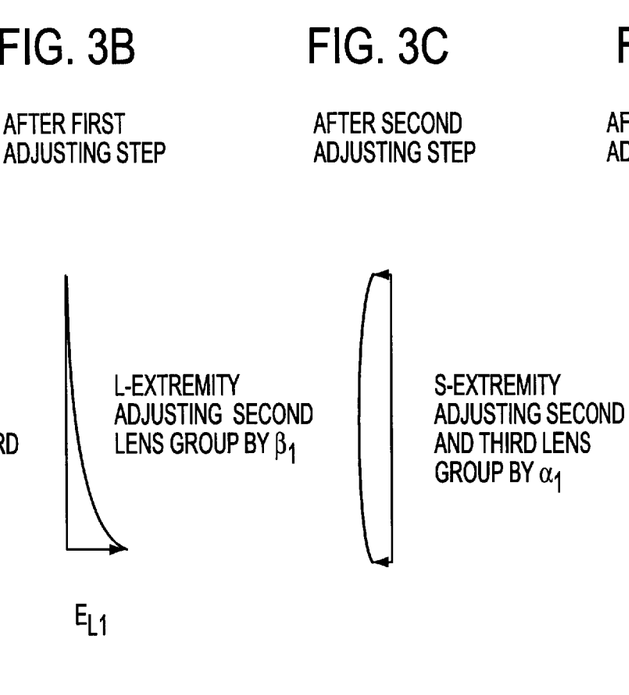
Figure 3D:
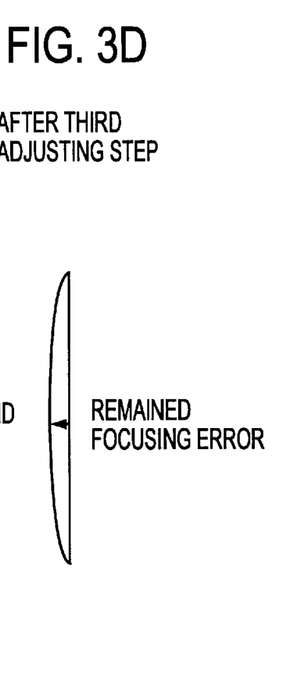

The adjusting method according to the present invention will be further discussed in detail with reference to the first embodiment shown in FIGS. 2 through 4. The testing chart plate 31 and the collimating lens 33 are utilized to form a certain object image on the CCD image pick-up device 21 which corresponds to the image of an object away from the zoom lens 10 by a predetermined distance. Initially, the testing chart plate 31 lies at the focal point of the collimating lens 33. The testing chart plate 31 is illuminated by a light source (not shown). With such an arrangement, the image printed on the testing chart plate 31 is formed on the CCD image pick-up device 21 through the collimating lens 33 and the zoom lens 10, and the image is converted by the CCD image pick-up device 21 into electrical signals (image signals) to detect a focusing state in accordance with the image signals. In the present embodiment, since the collimating lens 33 is arranged between the zoom lens 10 and the testing chart plate 31, an effect similar to that in the case where the testing chart plate 31 is positioned at an infinite distance is obtained.

The light receiving surface of the CCD image pick-up device 21, on which an object image is to be formed, lies in a reference focal plane of the zoom lens 10. That is, supposing that the zoom lens 10 is used for a camera using a silver halide film, the light receiving surface of the CCD image pick-up device 21 would coincide with the film surface. The image signals output from the CCD image pick-up device 21 are converted into predetermined-bit digital signals through an A/D converter 23 to be stored in a frame memory 25. When the image signals of one picture frame are stored in the frame memory 25, a CRT monitoring device 27 reads the image signals of one picture frame from the frame memory 25 to visually display the image of the picture frame. Furthermore, a computer 29 reads the image signals stored in the frame memory 25 which correspond to a predetermined portion of one picture frame and measures the contrast of an object so as to judge whether a image is formed on the CCD image pick-up device 21 based on the measured contrast. In the present embodiment, the contrast of a central portion of the image taken by the CCD image pick-up device 21 is used to detect a focusing state.

An initialized position adjusting method using the above-described device will be hereinafter discussed. In the following descriptions, S2, M2 and L2 represent the sensitivity of adjustment of the second lens group 12 at the shortest focal length S, the intermediate focal length M and the longest focal length L of the zoom lens 10, respectively. Likewise, S3, M3 and L3 represent the sensitivity of adjustment of the third lens group 13 at the shortest focal length S, the intermediate focal length M and the longest focal length L of the zoom lens 10, respectively. The term "sensitivity of adjustment" herein used means the amount of variation of a focus point when the corresponding lens group 12 or 13 is moved by a predetermined amount. Furthermore, ES, EM and EL represent the initial defocus amount at the shortest focal length S, the intermediate focal length M and the longest focal length L of the zoom lens 10, respectively.

Each of the initial defocus amounts is the amount of defocus between the reference focal plane of the zoom lens 10 and the actual image position, before adjusting the initialized positions. Each of the initial defocus amounts is unknown before any adjustment is applied thereto. The moving of the focus point rearwardly (in the direction to the right as viewed in FIGS. 1A or 2) is herein defined as a positive (plus) increase of the defocus amount. Conversely, the moving of the focus point forwardly (in the direction to the left as viewed in FIGS. 1A or 2) is defined as a negative (minus) increase of the defocus amount. As an example, initial defocus amounts ES (at the shortest focal length S), EM (at the intermediate focal length M) and EL (at the longest focal length L) are shown in FIG. 3A. For convenience, the defocus amount and the amount of movement of the lens groups, are herein described with positive (+) and negative (−) signs, in which amount with the positive sign represents the amount in the right direction of FIGS. 1 or 2, and the amount with the negative sign represents the amount in the left direction of FIGS. 1 or 2.

The testing chart plate 31 (note FIG. 1B) is made of a glass plate, provided with rectangular testing chart each containing a plurality of vertical lines each having a predetermined length and width. The chart plate 31 of the embodiment constitutes three charts. The testing charts SC, MC and LC are formed such that the respective pitches of the images of the testing charts SC, MC and LC formed on the CCD image pick-up device 21 through the collimating lens 33 and the zoom lens 10 will be substantially the same when the images of the testing charts SC, MC and LC are formed on the CCD image pick-up device 21 with the focal length of the zoom lens 10 being set to have the shortest focal length S, the intermediate focal length M and the longest focal length L, respectively. Namely, the pitches P of the chart image on the light receiving surface of the CCD image pick-up device 21 of zooming positions formed are substantially equal, and satisfy the following conditions:

$$P=(f_S/f_C)*PS=(f_M/f_M)*PM=(f_L/f_C)*PL$$

wherein:

$f_C$ represents the focal length of the collimating lens 33;

$f_S$ represents the focal length of the zoom lens 10 having the shortest focal length S;

$f_M$ represents the focal length of the zoom lens 10 having an intermediate focal length M;

$f_L$ represents the focal length of the zoom lens 10 having the longest focal length L;

* represents the multiplication sign; and

** represents the power sign

FIG. 4 shows the principle of detecting a focus point or the amount of defocus with the use of contrast detecting method. FIG. 4A shows a graph showing the variation of a contract value R in accordance with an amount of defocus $\epsilon$. The position indicated by "a" represents the in-focus position where the maximum contrast value R0 is obtained. The left and right sides of the maximum contrast value $R_0$ shows the front and rear deviation of the focus point on the image surface of the CCD image pick-up device 21; "b" in FIGS. 1A and 4 shows the rear focus.

Figure 4A:
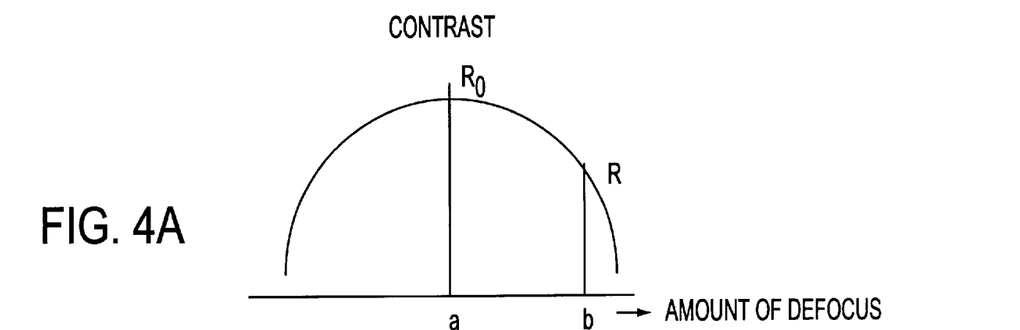
FIGS. 4A–4D are graphs showing a state of detecting the contrast of an image formed on a CCD through a contrast detecting method.

In the graph, the horizontal axis represents the amount of defocus $\epsilon$ (the amount of defocus along the optical axis) while the vertical axis represents the contrast value R. The term "amount of defocus $\epsilon$" herein used means the distance, length or deviation between the image plane of the testing chart plate 33 and the reference focal plane along the optical axis.

Figure 4B:
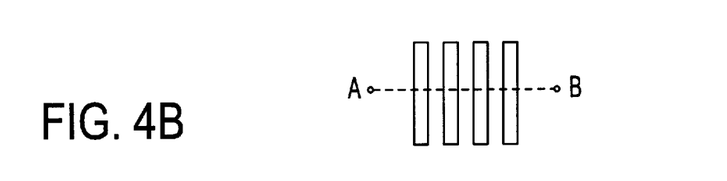
Figure 4C:
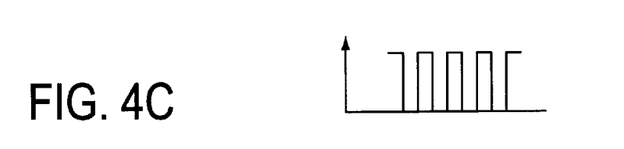
Figure 4D:
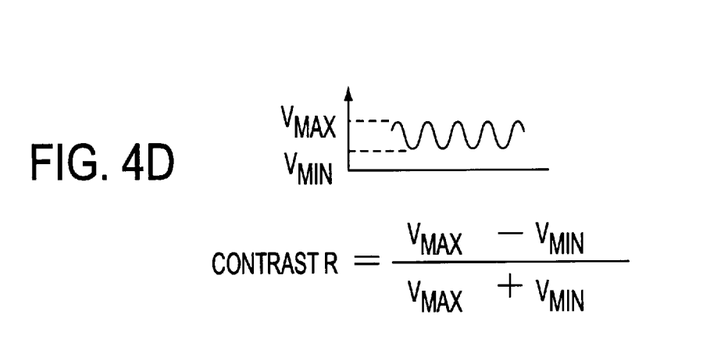

In the present embodiment, in order to measure the contrast, the central area lengthwise within the photographing area of the CCD image pick-up device 21 is utilized. Namely, the image contained in a horizontal field extending from point A to point B on the testing chart shown in FIG. 4B are used. FIG. 4C shows the actual distribution of the brightness of the image of the rectangular testing chart is in the shape of contrasting rectangles; however, the shape of the brightness distribution corresponds to that of the image of testing chart (shown in FIG. 4D). However, the amplitude (Vmax−Vmin) of the image signals output from the CCD image pick-up device 21 shown in FIG. 4D varies because the testing chart image becomes blurry according to the amount of defocus. In the present embodiment, providing that the maximum value and minimum value of image signal level are represented by Vmax and Vmin, respectively, the contrast value R can be obtained by the following equation:

R=(Vmax−Vmin)/(Vmax+Vmin).

In the present embodiment, the computer 29 outputs a command of zooming and a command of focusing to the drive controller 17. The drive controller 17 controls the stepping motors M2 and M3 upon receiving commands from the computer 29.

In order to obtain an in-focus state, the stepping motor M2 may be controlled by manually inputting a command of driving the stepping motor M2 with a key board of the computer 29 by an inspector while visually monitoring a display of the CRT monitoring device 27.

In the first embodiment, the testing chart plate 31 is moved relative to the collimating lens 33 to detect the amount of defocus and the direction thereof. During the movement of the testing chart plate 31 the second and third lens groups 12 and 13 (movable lens group) of the zoom lens 10 (the inspected lens) are not moved.

Moving the testing chart plate 31 from the reference position, i.e., the position identical to the focal point of the collimating lens 33, towards the zoom lens 10 by a predetermined length δ causes the focus position of the zoom lens 10 to deviate ε (move by length ε along the optical axis). The relation between the length δ and the amount of defocus ε is expressed by the following formulas (1) and (2):

$$\epsilon=(fZ/fC)**2*\delta \quad (1)$$

$$\delta=\epsilon/(fZ/fC)**2 \quad (2)$$

wherein:

fZ represents the focal length at any one focal length of the zoom lens 10; and fC represents the focal length of the collimating lens.

For example, providing that fZ, fC and δ are equal to 10 (mm), 50 (mm) and 1 (mm), respectively, the amount of defocus ε from the reference focal plane for an object at infinity is determined as follows:

$$\epsilon=(10/50)**2*1=0.04$$

Accordingly, the amount of defocus is determined precisely relative to the length (i.e., the amount of movement of the testing chart plate 31). In this particular example, an in-focus state with the testing chart plate 31 can be obtained by moving each of the second and third lens groups 12 and 13 by the same length obtained by the following formula:

$$\epsilon=-(S2+S3)\times\alpha$$

The first embodiment will be further discussed in detail with reference to FIG. 3. For reference, the second and third lens groups 12 and 13 are respectively moved by the stepping motors M2 and M3. Thus the moving amount of the second lens group 12 is determined according to the zoom data table set as the driving amount of the stepping motor M2. Similarly, the moving amount of the third lens group 13 is determined according to the zoom data table set as the driving amount of the stepping motor 13.

[Adjustment 1-1 (First Adjusting Step)]

The zoom lens 10 is set at the shortest focal length S, and each of the second and third lens groups 12 and 13 is moved to the respective initialized positions O2 and O3. Subsequently, the testing chart plate 31 is moved forwardly and rearwardly in order to measure the defocus amount. At this stage, since whether the direction of the defocus is unknown, the testing chart plate 31 is moved forwardly and rearwardly along the optical axis stepwise so as to detect the contrast value R of the image of the testing chart SC utilized at the shortest focal length which is formed on the CCD image pick-up device 21 at each step of moving. When the contrast value R is at a maximum, it means that the testing chart SC has been positioned at the in-focus position. In the case where δ represents the amount of movement of the testing chart plate 31 when the testing chart plate 31 is moved to the in-focus position and where ε represents the amount of defocus, the relationship between the amount of movement ε and the amount of defocus δ is expressed by the aforementioned formulas (1) and (2). Accordingly, it is possible to obtain the overall adjustment amount α1 of the second and third lens groups 12 and 13 by the following equation:

$$\epsilon=-(S2+S3)\times\alpha 1$$

Here, the following equation (1) is satisfied:

$$\begin{bmatrix} \Delta S \\ \Delta M \\ \Delta L \end{bmatrix} = \begin{bmatrix} ES \\ EM \\ EL \end{bmatrix} + \begin{bmatrix} S2+S3 \\ M2+M3 \\ L2+L3 \end{bmatrix} \times \alpha 1 = \begin{bmatrix} ES1 \\ EM1 \\ EL1 \end{bmatrix} \quad \text{[Equation 1]}$$

wherein:

$E_{S1}$, $E_{M1}$ and $E_{L1}$ represent the defocus amounts at the shortest focal length S, the intermediate focal length M and the longest focal length L, respectively, after the initialized positions of the second and third lens groups 12 and 13 are adjusted by the amount α1.

The defocus amount ES1 herein is the defocus amount after adjustment in order to cancel the defocus amount at the shortest focal length S, that is, the defocus amount which still remains after the second and third lens groups 12 and 13 have been adjusted by the same amount of adjustment α1 at the shortest focal length S of the zoom lens 10. Therefore that the defocus amount ES1 ideally is zero (0). The defocus amounts EM1 and EL1 shown in FIG. 3B are those which can be detected when the second and third lens groups 12 and 13 are zoomed to the intermediate focal length M and the longest focal length L, respectively after the second and third lens groups 12 and 13 are adjusted by the initialized position adjusting value α1, respectively (see FIG. 3B).

Hence, the second and third lens groups 12 and 13 are moved by the initialized position adjusting amount α1 from their initialized positions, which become the adjusted positions thereof.

[Adjustment 2-1 (Second Adjusting Step)]

The second and third lens groups 12 and 13 positioned at their provisional initialized positions are moved by the amount according to the zoom table data so that the second and third lens groups 12 and 13 are zoomed to have the longest focal length L. Subsequently, the testing chart plate 31 is moved forwardly and rearwardly stepwise, similar to the first adjusting step, to detect a defocus amount EL1 (FIG. 3B).

[Adjustment 3-1 (Third Adjusting Step)]

After completion of the adjustment 2-1, an amount of adjustment β1 of the second lens group 12 and the final initialized position adjustment amount α2 of the second and third lens groups 12 and 13, are obtained based on the defocus amount EL1. The adjusting amount β1 represents the amount of movement of the second lens group 12 in order to obtain a coinciding in-focus position at the shortest focal length S and the longest focal length L (FIG. 3(C)); the final initialized adjusting amount α2 represents the amount of movement of the second and third lens groups 12 and 13 in order to obtain an in-focus position which coincides with the reference focal plane of (FIG. 3(D)) at the shortest focal length S and the longest focal length L.

The ways of calculating the amounts of adjustments β1 and α2 will be discussed later in a paragraph [Amount of Adjustment].

Each of the second and third lens groups 12 and 13 at the longest focal length L is moved back to its provisional initialized position to obtain the shortest focal length S in accordance with the zoom data table. Subsequently, the second lens group 12 is moved from its provisional initialized position by the amount of adjustment β1+α2 to be positioned at its new initialized position while the third lens group 13 is moved from its initialized position by the amount of adjustment α2 to be positioned at its new initialized position.

[Adjustment 4-1 (Fourth Adjusting Step)]

After completion of the adjustment 3-1, the zoom lens 10 is driven with reference to the new initialized positions to carry out the zooming operation at each of the shortest focal length S (which corresponds to the new initialized positions of the second and third lens groups 12 and 13), the intermediate focal length M and the longest focal length L, after the defocus amounts ΔS, ΔM, and ΔL are measured, respectively. In the case where the values of the defocus amounts ΔS, ΔM, and ΔL obtained are each smaller than a predetermined value, the adjusting operation ends. Otherwise, the aforementioned first through third steps (i.e., the adjustments 1-1, 2-1 and 3-1) are repeated until each of the defocus amounts becomes smaller than the predetermined value.

Similar to the case of the adjustments 1 through 4, according to the result of adjustments as above described, the zoom lens 10 may further be adjusted as follows:

(1) The positions of the photo sensors 15 and 16 are changed so that the new initialized positions of the second and third lens groups 12 and 13 after completion of the adjustment according to the adjusting amounts β1 and α2 each obtained by the adjustments 1-1 and 2-1 (i.e., after completion of the adjustment 3-1) are detected as the adjusted initialized positions O2 and O3.

(2) The adjusting amount of the initialized position of the second lens group 12 and the adjusting amount of the initialized position of the third lens group 13 are obtained from the adjusting amounts β1, α1 and α2 and are stored in the EEPROM 18. During operation of the camera, the amount of movement of each of the second and third lens groups 12 and 13 is adjusted by reading the data table and the corresponding adjusting amounts.

(3) Once the adjustments 1-1 through 1-4 are carried out, the operation (1) as described above is carried out. Further, the amount of defocusing at the zooming positions ΔS, ΔM and ΔL obtained in the adjustment 4 (the first routine) are stored in the EEPROM 18 as correcting data, which may be used for adjusting the driving amounts of the second and third lens groups 12 and 13 together with the data of zoom table while the zooming operation of the camera is carried out.

Alternatively, the adjustments 1 through 4 are carried out once, then the operation (2) as described above is carried out. Further, the amounts of defocusing at the zooming position S, M and L obtained in the adjustment 4 (the first routine) are stored in the EEPROM 18 as correcting data, which may be used for adjusting the driving amounts of the second and third lens groups together with the data of the zoom table while the zooming operation of the camera is carried out.

[Amount of Adjustment]

A method of determining the respective adjusting amounts β1 and α2 of the second and third lens groups 12 and 13 will be hereinafter discussed.

After the positions of the second and third lens groups 12 and 13 are adjusted by the initialized positions' adjusting amount α1 obtained by the adjustment 1-1 (the first focus adjustment at the shortest focal length S) is completed, as the aforementioned defocus amount ES1 is zero (0), the adjusting amounts β1 and α2 need to satisfy the following equation (2) in order to make the defocus amount EL1 at the longest focal length L zero (0):

$$\begin{bmatrix} \Delta S \\ \Delta L \end{bmatrix} = \begin{bmatrix} ES1 \\ EL1 \end{bmatrix} + \begin{bmatrix} S2 \\ L2 \end{bmatrix} \times \beta 1 + \begin{bmatrix} S2 + S3 \\ L2 + L3 \end{bmatrix} \times \alpha 2 = \begin{bmatrix} 0 \\ 0 \end{bmatrix} \quad \text{[Equation 2]}$$

Therefore, the adjusting amounts, β1 and α2 can be determined by the following equations (3):

$$\beta 2 = \frac{(S2+S3)\times EL1 - (L2+L3)\times ES1}{S2\times L3 - S3\times L2} \cong \frac{(S2+S3)\times EL1}{S2\times L3 - S3\times L2} \quad \text{[Equations 3]}$$

$$\alpha 2 = \frac{-S2\times EL1 + L2\times ES1}{S2\times L3 - S3\times L2} \cong \frac{-S2\times EL1}{S2\times L3 - S3\times L2}$$

Each of the adjusting amounts: β1 and α2 will be herein determined by inserting actual numerical values of the zoom lens 10 in the respective valuables in the equations (3). The amount of variation of a focus point S2, S3, L2 and L3 when the corresponding lens group 12 or 13 is moved by 1 mm at the shortest objective distance S and the longest focal length L are equal to 0.200, 0.783, 0.856 and 0.006 (mm), respectively. The adjusting amounts β1 and α2 will be given as follows:

$$\beta 1 = \frac{0.983 \times EL1}{-0.669} \cong -1.4693 \times EL1 \quad \text{[Equations 4]}$$

$$\alpha 2 = \frac{-0.200 \times EL1}{-0.669} \cong 0.2989 \times EL1$$

Namely, the adjusting amount: β1 is in the direction opposite to the direction of the defocus amount EL1 by a length of approximately 1.47 times of the amount of the defocus amount EL1. Similarly, the adjusting amount α2 is in the same direction as that of the defocus amount EL1 by a length of approximately 0.30 times of the amount of the defocus amount EL1.

An example of a practical method of controlling the stepping motor M2 and M3 for the above discussed adjustment of the initialized positions will be described.

The drive controller 17 controls the second and third lens groups 12 and 13 in accordance with the number of drive pulses for the corresponding stepping motors M1 or M2. The initialized position of the second lens group 12 is measured by the photo sensor 15, and the initialized position of the third lens group 13 is measured by the other photo sensor 16.

Providing that U2 represents the amount of movement of the second lens group 12 per drive pulse of the stepping motor M2 and that U3 represents the amount of movement of the third lens group 13 per drive pulse of the stepping motor M3, the following equations are given:

wherein:
U2 is equal to K*U3 (K is a constant);
β1=βP1*U2
α2=Pα22*U2=Pα23*U3
U3/U2=Pα22/Pα23=K Pβ1, Pα22 and Pα23 represents the number of drive pulses in accordance with the amount of movement of the second and third lens groups 12, 13.

The respective numbers of drive pulses Pβ1, Pα22 and Pα23 can be determined b qy the following equations (5), (6) and (7):

wherein:
U2 is equal to 22.5μper one pulse, and
U3 is equal to 27.2μper one pulse.

$$\beta 1 = \frac{0.983 \times EL1}{-0.669} \cong -1.4693 \times EL1 \qquad [\text{Equation 5}]$$

$$\alpha 2 = \frac{-0.200 \times EL1}{-0.669} \cong 0.2989 \times EL1$$

$$P\beta 1 = \frac{(S2+S) \times EL1 - (L2+L3) \times ES1}{S2 \times L3 - S3 \times L2} \times \left(\frac{1}{U2}\right) \qquad [\text{Equation 6}]$$

$$= \frac{0.983 \times EL1 - 0.862 \times ES1}{-0.669} \times \left(\frac{1}{0.0225}\right)$$

$$= -65.30 \times EL1 + 57.27 \times ES1$$

$$\cong -65.3 \times EL1$$

$$P\alpha 22 = \frac{-S2 \times EL1 - L2 \times ES1}{S2 \times L3 - S3 \times L2} \times \left(\frac{1}{U2}\right) \qquad [\text{Equation 7}]$$

$$= \frac{-0.200 \times EL1 + 0.856 \times ES1}{-0.669} \times \left(\frac{1}{0.0225}\right)$$

$$= 13.29 \times EL1 - 56.87 \times ES1$$

$$\cong 13.3 \times EL1$$

Namely, in order to move the second and third lens groups 12 and 13 by the amount β1, the number of pulses which is equal to approximately 65 times the defocus amount EL1 is input to the stepping motor M2 to drive the same in the direction opposite to the direction of the defocus amount EL1.

Subsequently, in order to move the second and third lens groups 12 and 13 by the amount α2, the stepping motor M2 is driven to rotate with the number of pulses which is equal to approximately 13.3 times the defocus amount EL1 in the direction of the defocus amount EL1, while the stepping motor M3 is driven to rotate with the number of pulses which is equal to approximately 11 times the defocus amount EL1 in the direction of the defocus amount EL1. The respective numbers of pulses for driving the second and third lens groups 12 and 13 are stored in the EEPROM 18 as data for adjusting the initialized positions.

Although the zoom lens 10 the first embodiment is of a vary-focal type consisting of the fixed first lens group 11, the second movable lens group 12 and the third movable lens group 13, the lens position adjusting method of the present invention can be applied to other types of zoom lenses; namely, a zoom lens in which the zooming operation and the focusing operation are carried out independently of each other.

Although in the present embodiment the respective positions of the second lens group 12 (the focusing lens group) and the third lens group 13 (the focal length varying lens group) to bring an object at infinity into focus with the zoom lens 10 being set to obtain the shortest focal length S are defined as the initialized positions of the second and third lens groups 12 and 13, any other positions of the second lens group 12 and the third lens group 13 can be designated as the initialized positions of the second and third lens groups 12 and 13. For instance, the respective positions of the second and third lens groups 12 and 13 where to bring an object at a near distance into focus can be designated as the initialized positions, or the respective positions of the second and third lens groups 12 and 13 to bring an object at infinity into focus with the zoom lens 10 being set at the longest focal length L can be designated as the initialized positions.

Figure 5:
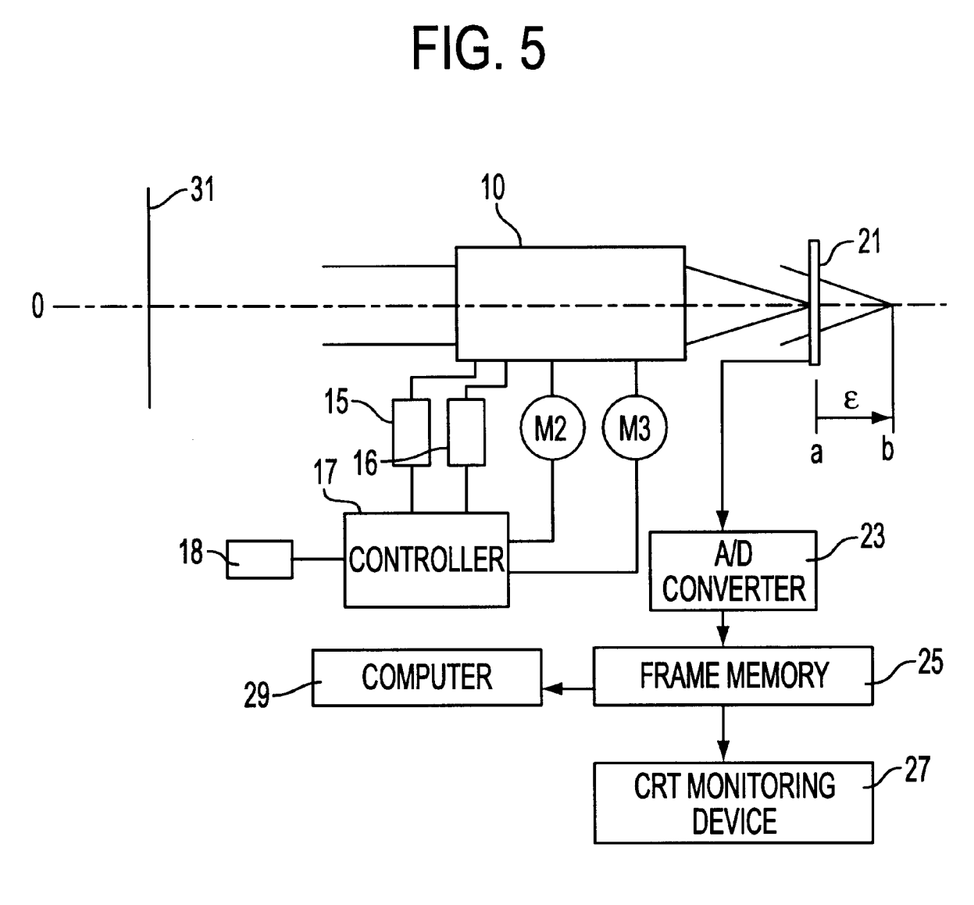
FIG. 5 is a block diagram showing a device which employs the adjusting method according to the present invention, wherein the chart plate is not moved.

Another method of adjusting according to the second embodiment of the present invention will be hereinafter discussed with further reference to FIG. 5.

Although the testing chart plate 31, the collimating lens 32 and the CCD image pick-up device 21, which are shown in FIGS. 1 and 2, are also used neither the testing chart plate 31 nor the collimating lens 33 is moved to measure the defocus amount; however, the second and third lens groups 12 and 13 are each moved to detect the defocus amount.

The essential elements of the device and the "contrast method" which is used for measuring the in-focus state in the second embodiment are the same as those of the first embodiment. Thus the explanations thereof are omitted. The elements of FIG. 5 that are common to those of FIG. 2 have the same reference numerals.

The method of adjusting according to the second embodiment will now be described with reference to the FIGS. 3 and 5.

[Adjustment 1-2 (First Adjusting Step)]

The zoom lens 10 is designed to have the shortest focal length S. Namely, the second and third lens groups 12 and 13 are positioned at the initialized positions O2 and O3, respectively. Subsequently, the second and third lens groups 12 and 13 are moved from their initialized positions O2 and O3 by the same amount of movement so that an image of the testing chart plate 31 is formed on the CCD image pick-up device 21 (focusing operation). At this stage, since the direction of moving each of the second and third lens groups 12 and 13 to focus the zoom lens 10 on the testing chart plate 31 is unknown, each of the second and third lens groups 12 and 13 is moved from the initialized positions O2 and O3 forwardly and rearwardly stepwise so as to detect the contrast value R of the image of the testing chart SC for the shortest focal length S, which is formed on the CCD image pick-up device 21 at each step of moving. When the contrast value R is at a maximum, it means that a sharp image of the testing chart SC is formed on the CCD image pick-up device 21.

Providing that the amount of movement from the initialized positions O2 and O3 by which each of the second and third lens groups 12 and 13 is moved so that a sharp image of the testing chart SC is formed on the CCD image pick-up device 21 is represented by α1, the aforementioned equation (1) is satisfied. In the present case, provided that the defocus amount is ES, the following equation is obtained:

(S2+S3)×α1=−ES

Subsequently, the second and third lens groups 12 and 13 are once returned to the initialized positions, then are respectively moved by the initialized positions adjusting amount α1. The obtained positions of the second and third lens groups 12 and 13 after their movements shall represent the provisional reference positions.

Here, the defocus amount ES1 is that which remains after the adjustment for canceling the defocus at the shortest focal length S, namely, after the second and third lens groups 12 and 13 have been adjusted by the same adjustment amount α1 at the shortest focal length S, so that the defocus amount ES1 becomes zero (0). The defocus amounts EM1 and EL1 shown in FIG. 3B are those which can be detected when the zoom lens 10 is set to have the intermediate focal length M and the longest focal length L, respectively, when the initialized positions of the second and third lens groups 12 and 13 are respectively adjusted by the initialized position adjusting amount α1 (see FIG. 3B).

[Adjustment 2-2 (Second Adjusting Step)]

Next, each of the second and third lens groups 12 and 13, which is currently positioned at its provisional initialized position after movements thereof by the initialized position adjusting amount α1, is moved by a driving amount necessary for the focal length of the zoom lens 10 to vary from the shortest focal length S to the longest focal length L in accordance with the zoom data table. The obtained positions of the second lens groups 12 after its movement becomes the initial position a2 of the longest focal length L. Thereafter the second lens group 12 is moved from initial position a2 forwardly and rearwardly stepwise to detect a position (in-focus position) where the maximum contrast value is obtained at the longest focal length L. In this in-focus position detecting operation, the testing chart LC for the longest focal length of the testing chart plate 31 is used.

Provided that the amount of movement of the second lens group 12 from the initial telephoto position a2 to the in-focus position is 62, the defocus amount EL1 at the longest focal length L is obtained by the following equation:

$$EL1 = -\delta2 \times L2$$

After the in-focus position of the second lens group 12 is detected at the longest focal length L, the second lens group 12 is moved back to the initial telephoto position a2 thereof.

[Adjustment 3-2 (Third Adjusting Step)]

According to the defocus amount EL1 at the longest focal length L which has been obtained in adjustment 2-2, the adjusting amount β1 of the second lens group 12 and the overall adjusting amount α2 of both the second and third lens groups 12 and 13 are obtained. The adjusting amount β1 corresponds to the adjusting amount of the second lens group 12 so that the imaging positions at the shortest focal length S and that at the longest focal length L are identical to each other (see FIG. 3 (C)). The overall adjusting amount α2 corresponds to the adjusting amount of the initialized position of each of the second and third lens groups 12 and 13 so that imaging positions of both the shortest focal length S and the longest focal length L finally coincide with the reference focal plane (see FIG. 3(D)). The adjusting amount β1 and the final adjusting amount of the initialized position adjust amount α2 are obtained in the same manner as above described "Amount of Adjustment."

Thereafter, the second lens group 12 is moved from the initial telephoto position a2 by the adjusting amount β1. Subsequently, each of the second and third lens groups 12 and 13 is moved from its current position by an amount necessary for the focal length of the zoom lens 10 to vary from the longest focal length L to the shortest focal length S in accordance with the zoom data table. At this stage, the position of the second lens group 12 is deviated from its initialized position O2 by the adjustment amount α1+β1 while the temporary initialized position of the third lens group 13 is deviated from its initialized position O3 by the adjustment amount α1. From the above-described positions, the second and third lens groups 12 and 13 are each further moved by the adjusting amount α2. The positions of the second and third lens groups 12 and 13 after having been moved by the adjusting amount α2 are utilized as the adjusted new initialized positions of the second and third lens groups 12 and 13.

In the case where the lens positions of the second and third lens groups 12 and 13 after completion of movements by the amount of α1 are regarded as the reference positions, the adjusting amount for the second lens group 12 from its reference position is represented by β1+α2 while the adjusting amount for the third lens group 13 from its reference position is represented by α2. On the other hand, in the case where the initialized positions O2 and O3 of the second and third lens groups 12 and 13 are regarded as the reference positions, the adjusting amount for the second lens group 12 from its reference position is represented by α1+β1+α2 while the adjusting amount for the third lens group 13 from its reference position is represented by α1+α2, each value represents the correcting amount of the initial position. The timing of movement of the second lens group 12 by the adjusting amount 1 may be after completion of movements of the second and third lens groups 12 and 13 from the longest focal length L to the shortest focal length S.

[Adjustment 4-2 (Fourth Adjusting Step)]

After completion of the above-mentioned adjustments 1-2 through 3-2, the zoom lens 10 is driven with reference to the new initialized positions to the shortest focal lengths S (the positions of which correspond to the adjusted initialized positions of the second and third lens groups 12 and 13), the intermediate focal length M and the longest focal length L; and the focusing operation is carried out. In the case where the values of the defocus amounts ΔS, ΔM, and ΔL (absolute values) obtained are smaller than a predetermined value, the adjusting operation ends. When the values of the defocus amounts ΔS, ΔM, and ΔL (absolute values) obtained are larger than a predetermined value, the aforementioned adjustments 1-2, 2-2 and 3-2 are repeated.

According to the result of above described adjustments, the zoom lens 10 may further be adjusted similar to the case of the first embodiment.

As can be understood from the foregoing, according to the adjusting method and device to which the second embodiment is applied, the defocus amounts at the reference initialized positions are obtained at both the shortest focal length S and the longest focal length L, thereby the adjusting amount of the initialized positions of the movable lenses group are obtained. Therefore the measurement and the adjustment can easily be carried out in a short time span. In addition, since the testing chart plate 31 and the collimating lens 33 in the close positions are used, the focus adjustment can easily be carried out by a small, compact device regardless of distance of the object.

[Effect of the Invention]

As can be understood from the foregoing, according to the present invention, the defocus amount at the initialized position at the first focal length and the defocus amount at the second focal length are both obtained with respect to an object at a predetermined distance, thereby the adjusting amount of the initialized positions of the movable lens groups are obtained. Therefore the measurement and the adjustment can simply be carried out without consuming much time.

Further, according to the present invention in which the defocus amount at a predetermined focal length is measured by moving the object, since it is not necessary for the lens groups to move during measurement of the defocus amount, the measurement and adjustment can simply be carried out without consuming much time. In this case, if the testing chart plate and the collimating lens are used as the object, the chart plate and collimator can be set at close positions; hence, the focus adjustment can easily be carried out by a small, compact device regardless of the distance of the object.

According to the present invention in which the defocus amount at the initialized position at the predetermined focal length is obtained by moving the movable lens groups, the defocus amount can be obtained by simply moving the movable lens groups, thereby making the control thereof easier to be carried out, and the measurement and adjustment can easily be carried out without consuming much time.

We claim:

1. A lens position adjusting method for a zoom lens comprising at least two movable lens groups, one of said lens groups is utilized chiefly for focusing and the other of said lens groups is utilized chiefly for varying magnification, wherein an object at a predetermined distance is in-focus when each said movable lens group is positioned at each of respective initialized positions thereof with said zoom lens being set at a first focal length, and wherein each said movable lens group is moved to vary magnification in accordance with a moving amount from said initialized positions of said movable lens groups, said lens position adjusting method comprising:
arranging an object at a position corresponding to a predetermined distance from said zoom lens;
arranging a focal point detecting means at a reference focal plane or in the vicinity of said reference focal plane of said zoom lens;
moving each said movable lens group to each position thereof at said first focal length and at least a second focal-length;
detecting a defocus amount at a given plurality of focal lengths by said focal point detecting means corresponding to a difference between a position at which a image of said testing object is formed via said zoom lens and said reference focal plane; and
obtaining an adjusting amount according to said defocus amount detected at given plurality of focal lengths so that each position of said movable lens group at which said in-focus state with said testing object is obtained at said first focal length serves as each new initialized position.

2. The lens position adjusting method according to claim 1, further comprising a first adjusting stage which comprises:
moving each said movable lens group of said zoom lens to each of said initialized positions as positions at said first focal length;
detecting said defocus amount with respect to said testing object;
obtaining an overall adjusting amount according to said defocus amount in order to move each said movable lens group to positions at which said movable lens groups obtain said in-focus state with said testing object; and
moving each said movable lens group by the same amount according to said overall adjusting amount.

3. The lens position adjusting method according to claim 2, further comprising a second adjusting stage which comprises:
making each position of said movable lens groups a provisional initialized position after said movable lens groups are moved according to said first adjusting stage;
moving each said movable lens group from said provisional initialized positions by an amount corresponding to a moving amount from a position at said first focal length to a position at a second focal length;
obtaining a defocus amount at a position of said second focal length.

4. The lens position adjusting method according to claim 3, further comprising a third adjusting stage which comprises:
obtaining an adjusting amount of each said movable lens group utilized for said focusing which moves each said movable lens group so that a focal point at said first focal length is identical to a focal point at said second focal length according to said defocus amount obtained at said second adjusting stage after completion of said second adjusting stage;
obtaining a final adjusting amount of initialized positions in order to move each said movable lens group from said provisional initialized positions;
placing each said movable lens group at said provisional positions by moving said movable lens groups by an amount corresponding to a moving amount from said position at said second focal length to said position at said first focal length;
making the position after said movable lens group utilized for said focusing is moved from said provisional initialized position by an amount corresponding to said adjusting amount and said final adjusting amount of initialized positions as an adjusted initialized position; and
making the positions after said movable lens group utilized for said magnification are moved by said final adjusting amount of initialized positions as each of the adjusted initialized positions.

5. The lens position adjusting method according to claim 4, further comprising a fourth adjusting stage which comprises:
moving each said movable lens group by an amount corresponding to positions at a predetermined focal length with reference to said adjusted initialized positions at said first focal length;
detecting defocus amounts against said testing object at each position at a given plurality of focal lengths; and
repeating said first through third adjusting stages until all or some of said defocus amounts are within a scope of a predetermined value.

6. The lens position adjusting method according to claim 1, further comprising a CCD image pick-up device positioned at a reference initialized focal plane of said zoom lens, and a means to obtain a defocus amount according to a contrast of image taken by said CCD image pick-up device.

7. The lens position adjusting method according to claim 1, wherein said first focal length is the shortest focal length of said zoom lens, and wherein said second focal length is the longest focal length of said zoom lens.

8. The lens position adjusting method according to claim 1, wherein said predetermined distance is infinity, and wherein said testing object comprises a testing chart plate arranged at a focal point of said collimating lens or in the vicinity of said collimating lens, on which at least one testing chart is formed, and wherein light rays which are reflected by said testing chart plate are incident on said zoom lens through said collimating lens.

9. A lens position adjusting method for a zoom lens comprising at least two movable lens groups, one of said lens groups being utilized chiefly for focusing and the other of said lens groups being utilized chiefly for varying magnification, wherein an object at a predetermined distance is in-focus when said at least two movable lens groups are positioned at respective initialized positions thereof with said zoom lens being set at a first focal length, and wherein said at least two movable lens groups are moved to vary magnification in accordance with predetermined data while said in-focus state for said object is maintained;

said lens position adjusting method comprising:
arranging a focal point detecting means at a reference focal plane or in the vicinity of said reference focal plane of said zoom lens;
arranging an object moving means which moves either a collimating lens or an object placed at a focal point of said collimating lens forwardly and rearwardly along the optical axis of the zoom lens in front of said zoom lens;
moving each said movable lens group to at least said first focal length at each position thereof;
moving either said collimating lens or said object along an optical axis of said zoom lens so that a moving amount of said collimating lens or said object is detected when an image of said object is formed on said focal point detecting means through said collimating lens and the zoom lens;
obtaining a defocus amount which corresponds to a difference between the position of said image of said object and the position of said reference focal plane; and
obtaining an adjusting amount according to said defocus amount so that the position of each said movable lens group, at which said in-focus state with said object is obtained, serves as each adjusted initialized position.

10. The lens position adjusting method according to claim 9, wherein said testing object comprises a testing chart plate on which at least one testing chart is formed, and wherein light rays which are reflected by said testing chart plate are incident on said zoom lens through said collimating lens.

11. The lens position adjusting method according to claim 9, further comprising a first adjusting stage comprising:
moving each said movable lens group of said zoom lens to each said initialized position as positions at said first focal length;
driving said testing object moving means at said initialized positions so that said focal point detecting means detects said defocus amount against said testing object;
obtaining an overall adjusting amount according to said defocus amount in order to move each said movable lens group to each position at which said movable lens group obtains said in-focus state with said testing object; and
moving each said movable lens group by the overall adjusting amount.

12. The lens position adjusting method according to claim 11, further comprising a second adjusting stage which comprises:
making each position after said movable lens groups are moved according to said first adjusting stage a provisional initialized position of movable lens group;
moving each said movable lens group from said provisional initialized positions by an amount corresponding to a moving amount from a position at said first focal length to a position at a second focal length;
driving said testing object moving means after completion of movement at said second focal length in order to detect said moving amount; and
obtaining a defocus amount against said testing object according to said moving amount.

13. The lens position adjusting method according to claim 12, further comprising a third adjusting stage which comprises:
obtaining an adjusting amount of each said movable lens group serving said focusing which moves each said movable lens group so that a focal point at said first focal length is identical to a focal point at said second focal length according to said defocus amount obtained at said second adjusting stage after completion of said second adjusting stage;
obtaining a final adjusting amount of initialized positions in order to move each said movable lens group from said provisional initialized positions;
arranging each said movable lens group at said provisional positions by moving said movable lens groups by an amount corresponding to a moving amount from said position at said second focal length to said position at said first focal length;
making a position after said movable lens group being utilized for said focusing is moved from said provisional initialized position by an amount corresponding to said adjusting amount and said final adjusting amount of initialized positions as a new initialized position; and
making a position after said movable lens group serving said magnification is moved by said final adjusting amount of initialized position as another new initialized position.

14. The lens position adjusting method according to claim 13, further comprising a fourth adjusting stage which comprises:
moving each said movable lens group by an amount corresponding to positions at a predetermined focal length with reference to said new initialized positions at said first focal length;
detecting defocus amounts against said testing object at each position at given plurality of focal lengths; and
repeating said first through third adjusting stages until all or some of said defocus amounts are within the scope of a predetermined value.

15. The lens position adjusting method according to claim 9, further comprising a image pick-up means which comprises:
taking pictures of said testing object by said image pick-up means through step-by-step movement of either said testing object or said collimating lens by said testing object moving means;
detecting a moving amount of either said testing object or said collimating lens when an image of said testing object is formed on said reference focal plane according to a taken contrast of said image of said testing object; and
obtaining a defocus amount according to said moving amount.

16. A lens position adjusting method for a zoom lens comprising at least two movable lens groups, one of said lens groups being chiefly utilized for focusing and the other of said lens groups being chiefly utilized for varying magnification, wherein an object at a predetermined distance is in-focus when each said movable lens group is positioned at each initialized position thereof with said zoom lens being set at a first focal length, and wherein each said movable lens group is moved to vary magnification in accordance with a moving amount from said initialized positions of said movable lens groups, said lens position adjusting method comprising:

arranging an object at a position corresponding to a predetermined distance from said zoom lens;

arranging a focal point detecting means at a reference focal plane or in the vicinity of said reference focal plane of said zoom lens;

moving each said movable lens group to each position at said first focal length;

moving each said movable lens group along an optical axis of said zoom lens so that a lens moving amount of each movable lens group is detected when an image of said testing object is formed on said focal point detecting means via said zoom lens;

making each position of said movable lens groups a provisional initialized positions after completion of movement by said lens moving amount from said initialized positions;

moving each said movable lens group from said provisional initialized positions to positions at a predetermined focal length;

detecting said lens moving amount by moving said movable lens group being chiefly utilized for focusing;

obtaining a defocus amount from said lens moving amount; and obtaining an adjusting amount according to said defocus amount detected at given plurality of focal lengths so that each position of said movable lens groups at which said in-focus state with said testing object is obtained at said first focal length serves as each new initialized position.

17. The lens position adjusting method according to claim 16, wherein said testing object comprises a testing chart plate on which at least one testing chart is formed, and wherein light rays which are reflected by said testing chart plate are incident on said zoom lens through said collimating lens.

18. The lens position adjusting method according to claim 17, further comprising a first adjusting stage which comprises:

moving each said movable lens group of said zoom lens to each said initialized position as positions at said first focal length;

moving each said movable lens group by the same amount so that said focal point detecting means detects positions where an in-focus state is obtained;

obtaining an overall adjusting amount in order to move each said movable lens group from said initialized positions to positions at which said movable lens groups obtain said in-focus state with said testing object; and moving each said movable lens group by the same amount according to said overall adjusting amount.

19. The lens position adjusting method according to claim 18, further comprising a second adjusting stage which comprises:

making each position, after said movable lens groups are moved according to said first adjusting stage, a provisional initialized position of said movable lens group;

moving each said movable lens group from said provisional initialized positions by an amount corresponding to a moving amount from a position at said first focal length to a position at a second focal length;

moving said one of movable lens groups which is chiefly utilized for focusing after completion of movement at said second focal length in order to detect a moving amount of said one of movable lens groups when an image of said testing object is formed on said focal point detecting means; and obtaining a defocus amount according to said moving amount.

20. The lens position adjusting method according to claim 19, further comprising a third adjusting stage which comprises:

obtaining an adjusting amount of each said movable lens group being utilized for said focusing which moves each said movable lens group so that a focal point at said first focal length is identical to a focal point at said second focal length according to said defocus amount obtained at said second adjusting stage after completion of said second adjusting stage;

obtaining a final adjusting amount of initialized positions in order to move each said movable lens group from said provisional initialized positions;

placing each said movable lens group at said provisional positions by moving said movable lens groups by an amount corresponding to a moving amount from said position at said second focal length to said position at said first focal length;

making a position after said movable lens group serving said focusing is moved from said provisional initialized position by amounts corresponding to said adjusting amount and said final adjusting amount of initialized positions as an new initialized position; and making positions after said movable lens group serving said magnification are moved by said final adjusting amount of initialized positions as each of the new initialized positions.

21. The lens position adjusting method according to claim 20, further comprising a fourth adjusting stage which comprises:

moving each said movable lens group by an amount corresponding to positions at a predetermined focal length with reference to said new initialized positions at said first focal length;

detecting defocus amounts against said testing object at each position at given plurality of focal lengths; and repeating said first through third adjusting stages until all or some of said defocus amounts are within a scope of a predetermined value.

22. The lens position adjusting method according to claim 20, wherein said zoom lens comprises a first fixed lens group, and said at least two movable lens groups of a second movable lens group and a third movable lens group, in this order from an object side to an image side;

wherein the focal length of said zoom lens is determined by a position of said third movable lens group, and wherein said second movable lens group is moved relative to said third movable lens group to carry out the focusing operation.

23. The lens position adjusting method according to claim 22, wherein said zoom lens comprises:

first and second stepping motors for driving said second and third movable lens groups, respectively;

first and second initialized position detecting means for detecting whether said second and third movable lens groups are positioned at said initialized positions thereof, respectively;

a drive controller for controlling each of said first and second stepping motors; and a memory for storing respective focal lengths within a range of zooming operation and primary positions of each of said second and third movable lens groups for a plurality of given focal lengths of said zoom lens against said testing object at given plurality of focal lengths, as data of corresponding numbers of pulses for driving said second and third stepping motors to move said second and third movable lens groups from said respective initialized positions thereof.

24. The lens position adjusting method according to claim 23, wherein said memory stores a data table of a plurality of given object distances and predetermined movement-data for moving said second lens group for a plurality of given object distances.

25. The lens position adjusting method according to claim 24, wherein said zoom lens is used for a camera provided with an object distance measuring device, wherein said drive controller controls said first stepping motor by a drive amount which corresponds to data selected from said data table in accordance with a currently-set focal length of said zoom lens and an object distance detected by said object distance measuring device.

26. The lens position adjusting method according to claim 23, wherein said memory stores said adjusting amount obtained at said third adjusting stage and said final adjusting amount of initialized positions obtained at said fourth adjusting stage.

27. The lens position adjusting method according to claim 22, further comprising a CCD image pick-up device positioned at a reference initialized focal plane of said zoom lens, wherein said focal point detecting means includes said CCD image pick-up device, wherein said defocus amount is obtained according to contrast of image taken by said CCD image pick-up device.

28. A zoom lens comprising:

at least two movable lens groups, wherein an object at a predetermined distance is in-focus when said at least two movable lens groups are positioned at respective initialized positions thereof with said zoom lens being set at first focal length, and wherein said at least two movable lens groups are moved to vary magnification in accordance with predetermined data while said in-focus state for said object is maintained;

an initial position detecting means for detecting whether at least two movable lens groups are positioned at said respective initialized positions thereof;

a memory for storing data of moving amount of each said movable lens group from said respective initialized positions detected by said initialized position detecting means to positions at a predetermined focal length and at which an image of said object at said predetermined distance is formed; and wherein said zoom lens is adjusted so that said initial position detecting means detects said new initialized positions according to said adjusting amount obtained by the method according to claim 20, and according to said final adjusting amount of initialized positions.

29. A zoom lens comprising:

at least two movable lens groups, wherein an object at a predetermined distance is in-focus when said at least two movable lens groups are positioned at respective initialized positions thereof with said zoom lens being set at first focal length, and wherein said at least two movable lens groups are moved to vary magnification in accordance with predetermined data while said in-focus state for said object is maintained;

a memory for storing data of moving amount of each said movable lens group from said respective initialized positions to positions at a predetermined focal length and at which an image of said object at said predetermined distance is formed; and wherein said memory of said zoom lens stores said adjusting amount obtained by the method according to claim 20, and said final adjusting amount of initialized positions, so that a respective position of each said movable lens group is adjusted according to said adjusting amount read from said memory and according to said final adjusting amount of initialized position when each said movable lens group moves to said initialized positions which are detected by said initialized position detecting means.

30. The zoom lens according to claim 29, wherein said zoom lens comprises a first fixed lens group, and said at least two movable lens groups of a second movable lens group and a third movable lens group, in this order from an object side to an image side, wherein a focal length of said zoom lens is determined by a position of said third movable lens group, and wherein said second movable lens group is moved relative to said third movable lens group to carry out a focusing operation.

31. The zoom lens according to claim 29, wherein said zoom lens comprises:

first and second stepping motors for driving said second and third movable lens groups, respectively;

first and second initialized position detecting means for detecting whether said second and third movable lens groups are positioned at said initialized positions thereof, respectively;

a drive controller for controlling each of said first and second stepping motors; and a memory for storing respective focal lengths within a range of zooming operation and primary positions of said second and third movable lens groups for a plurality of given focal lengths of said zoom lens against said testing object at given plurality of focal lengths, as data of corresponding numbers of pulses for driving said second and third stepping motors to move said second and third movable lens groups from said respective initialized positions thereof.

32. The zoom lens according to claim 31, wherein said memory stores a data table of a plurality of given object distances and predetermined movement-data for moving said second lens group for a plurality of given object distances.

33. The zoom lens according to claim 32, wherein said zoom lens is used for a camera provided with an object distance measuring device, wherein said controller controls said first stepping motor by a drive amount which corresponds to data selected from said data table in accordance with a currently-set focal length of said zoom lens and an object distance detected by said object distance measuring device.

34. A zoom lens comprising:

at least two movable lens groups, wherein an object at a predetermined distance is in-focus when said at least two movable lens groups are positioned at respective initialized positions thereof with said zoom lens being set at first focal length, and wherein said at least two movable lens groups are moved to vary magnification in accordance with predetermined data while said in-focus state for said object is maintained;

a memory for storing data of moving amount of each said movable lens group from said respective initialized positions to positions at a predetermined focal length and at which an image of said object at said predetermined distance is formed;

wherein said memory of said zoom lens stores said defocus amount at given plurality of focal lengths as an amending data obtained by the method according to claim 20; and further comprising an adjusting means which adjusts each position of said movable lens group according to said amending data read from said memory when each of said movable lens group moves from said initialized positions according to said moving amount read from said memory.

* * * * *